United States Patent
Jin et al.

(10) Patent No.: US 6,189,033 B1
(45) Date of Patent: Feb. 13, 2001

(54) METHOD AND SYSTEM FOR PROVIDING PERFORMANCE GUARANTEES FOR A DATA SERVICE SYSTEM OF A DATA ACCESS NETWORK SYSTEM

(75) Inventors: Tai Jin, San Mateo; James D. Salehi, Mountain View; Richard J. Friedrich, San Jose; Nina T. Bhatti, Mountain View, all of CA (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/116,716

(22) Filed: Jul. 16, 1998

(51) Int. Cl.[7] .............................. G06F 15/173; G06F 7/00
(52) U.S. Cl. ............................................ 709/225; 709/224
(58) Field of Search ..................................... 709/201, 202, 709/203, 223, 224, 225; 707/1

(56) References Cited

U.S. PATENT DOCUMENTS

| | | | | |
|---|---|---|---|---|
| 5,708,780 | * | 1/1998 | Levergood et al. | 709/229 |
| 5,796,952 | * | 8/1998 | Davis et al. | 709/224 |
| 5,913,041 | * | 6/1999 | Ramanathan et al. | 709/233 |
| 5,961,588 | * | 10/1999 | Cooper et al. | 709/203 |
| 5,961,602 | * | 10/1999 | Thompson et al. | 709/229 |
| 5,999,971 | * | 12/1999 | Buckland | 709/218 |
| 6,094,680 | * | 7/2000 | Hokanson | 709/223 |

* cited by examiner

*Primary Examiner*—Krisna Lim
(74) *Attorney, Agent, or Firm*—Thomas X. Li

(57) ABSTRACT

A data service system is described that includes a plurality of data content sites and is coupled to a number of user terminals via a network. The data service system also includes a system for providing performance guarantees for the content sites. The system for providing performance guarantees includes a plurality of class processors, each for controlling access throughput of one of the content sites in accordance with a predetermined admission control policy. When one of the class processors receives an access request for one of the content sites, that class processor determines if the access request should be accepted based on the corresponding admission control policy and sends the access request to the corresponding content site when accepting the access request. The system also includes a classifier that determines to which one of the class processors the access request should be sent. A method of controlling access throughput of the content sites is also described.

5 Claims, 6 Drawing Sheets

METHOD AND SYSTEM FOR PROVIDING PERFORMANCE GUARANTEES FOR A DATA SERVICE SYSTEM OF A DATA ACCESS NETWORK SYSTEM

BACKGROUND OF THE INVENTION

1. Field of the Invention

The present invention pertains to data access network systems. More particularly, this invention relates to a system and method for providing performance guarantees for content sites (e.g., world wide web sites) hosted in a data service system such that accesses to one content site do not affect the performance of accesses to other content sites.

2. Description of the Related Art

An example of a data access network system is an Internet/Intranet network system. An Internet/Intranet network system typically includes a data service system and an interconnect network that connects the data service system to subscriber or user terminals or other data service systems. The data service system is typically referred to as an Internet/Intranet Service Provider(ISP) system. The ISP system can host a number of content sites. The ISP system can also be connected to other ISP systems via an interconnect network, thus forming the Internet/Intranet network system. The users connected to the ISP system can access the content sites within the ISP system or the content sites within the other ISP systems via the network.

An ISP system typically includes web and/or content servers that host contents for various customers or applications. The customers are the owners of the contents and the ISP system is used for the customers to host their contents such that subscribers or users can access the contents via their computer terminals connected to the ISP system. The content servers typically utilize Internet applications, such as electronic mail, bulletin boards, news groups, and World Wide Web access. The hosted contents are arranged in the form of content sites within the content servers. This means a content site is for one customer while a particular customer may own a number of content sites. In addition, the ISP system may have a Proxy server that allows a network administrator to restrict access to the Internet. Another use of the Proxy server is to cache frequently accessed data from the Internet.

The ISP system can host multiple content sites for various customers. For example, the ISP system may host a content site for one customer and one or a number of content sites for another customer. This allows an individual customer to obtain the benefits provided by the ISP system without actually acquiring the physical ISP system. This also allows the resources of the ISP system to be effectively and efficiently used and managed.

However, one problem associated with such an arrangement is that the ISP system typically does not provide performance guarantees for the content sites it hosts. This means that the ISP system does not provide features like performance stability over a range of client demands, non-interference performance among co-hosted content sites, targeted performance, and overload protection for the hosted content sites. As is known, when a customer contracts the ISP system to host a content site, the customer typically desires that access requests to his content site can be quickly processed without delay. However, because the ISP system typically hosts multiple content sites and the content sites hosted by the ISP system can be accessed by multiple users, unbearably long delays or even deadlocks may occur when the total number of access requests received by the ISP system at one time greatly exceeds the total number of access requests permitted by the ISP system (i.e., the entire system is overloaded). When this occurs, the performance of each of the content sites is affected. This is true even when all of the user access requests may be directed to just one of the content sites. This thus hinders the ISP system to provide quality services for its customers who host their content sites in the ISP system.

SUMMARY OF THE INVENTION

One feature of the present invention is to allow a data service system to provide performance guarantees for a content site hosted in the data service system.

Another feature of the present invention is to provide access throughput control for a content site hosted in a data service system, wherein the data service system hosts a number of content sites each of which can be accessed by multiple users at the same time.

A further feature of the present invention is to ensure that accesses to a content site hosted by a data service system are not affected by accesses to other content sites hosted by the same data service system.

A still further feature of the present invention is to allow a data service system to provide stable and targeted performance, overload protection, and tiered levels of request class performance for its hosted content sites.

A data service system is described that includes a plurality of data content sites and is coupled to a number of user terminals via a network. The data service system also includes a system for providing performance guarantees for the content sites. The system for providing performance guarantees includes a plurality of class processors, each for controlling access throughput of one of the content sites in accordance with a predetermined admission control policy of that content site. When one of the class processors receives an access request for one of the content sites, that class processor determines if the request should be accepted based on the corresponding admission control policy and sends the access request to the corresponding content site if the access request is determined to be accepted. The system also includes a classifier that determines to which one of the class processors the access request should be sent.

A method of controlling access throughput of the content sites is also described. The method includes the step of defining an admission control policy for one of the content sites. Upon receiving an access request, the method then determines to which one of the content sites the access request is sent. The method then determines if the access request should be allowed to access the corresponding content site based on the admission control policy for that content site. If the admission control policy allows the access request to access the corresponding content site, then the method allows the access request to access the corresponding content site.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
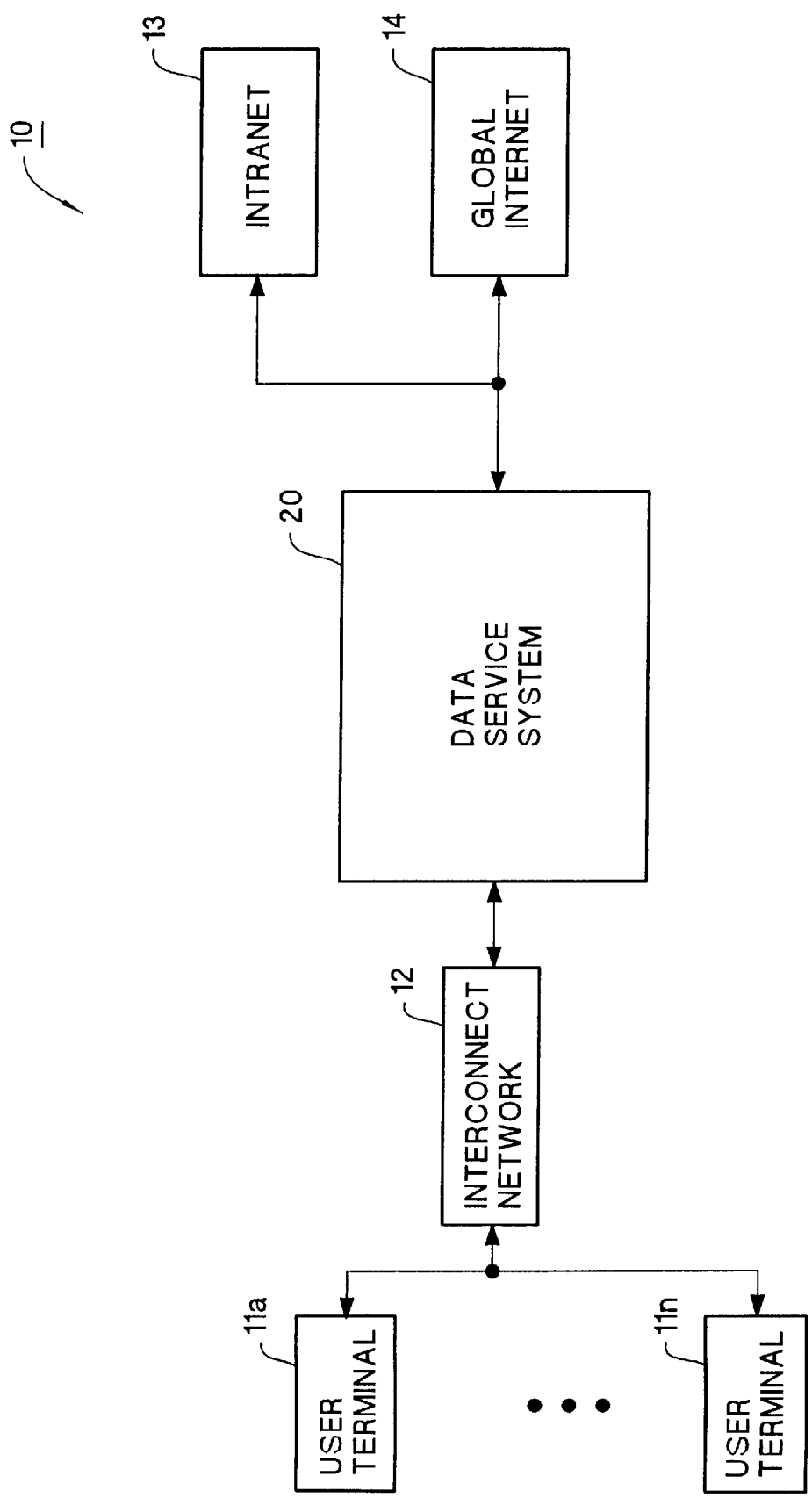
FIG. 1 shows a data access network system that includes a data service system that implements one embodiment of the present invention.

FIG. 1 shows a data access network system 10 that includes a data service system 20 that implements one embodiment of the present invention. The data service system 20 can be employed by an Internet/Intranet Service Provider (ISP) to offer data services (e.g., web, news, or advertisement) and other services (e.g., e-commerce, e-mail) to users or subscribers connected to the data service system 20. The data service system 20 can also be referred to as an ISP system.

As will be described in more detail below, the data service system 20 includes an access processing system (i.e., the system 100 in FIG. 3) that implements one embodiment of the present invention. The access processing system 100 is located in a connection-based (or TCP-based) server (shown in FIGS. 2 and 3) of the data service system 20. TCP stands for Transmission Control Protocol. A connection-based server is the server that can handle classifiable requests. A connection-based server contains a number of content sites. A content site refers to a database that contains a set of content data and/or applications for access. The content sites can be accessed by multiple users at the same time.

In accordance with one embodiment of the present invention, the access processing system 100 provides access throughput control to each or some of the content sites within a connection-based server by controlling or limiting the access request rate and/or data transfer rate of the content sites. This allows stable, independent, and targeted performance for those content sites. In other words, the access processing system 100 allows the performance of a content site in the data service system 20 to be stable and independent of other content sites. This means that the access processing system 100 provides virtual isolation among the content sites in the data service system 20. The access processing system 100 also allows the data service system 20 to guarantee a content site with a specifically targeted performance or access rate. The access throughput control function of the access processing system 100 also provides the data service system 20 with overload protection and tiered levels of requests class performance when the data service system 20 are hosting multiple content sites. The access processing system 100 will be described in more detail below, also in conjunction with FIGS. 1–6.

Referring to FIG. 1, the data access network system 10 includes a global Internet 14 and an Intranet 13 connected to the data service system 20. Each of the global Internet 14 and Intranet 13 includes a number of data service systems connected together via a network. Data communications among all the data service systems (including the data service system 20) are conducted using a predetermined open standard communication protocol for Internet/Intranet communications. In one embodiment, the open standard communication protocol is the Hyper Text Transport Protocol (i.e., HTTP). Alternatively, other known communication protocols for Internet/Intranet communications can also be used. Each of the data service systems in the Intranet 13 and Internet 14 has substantially the same functional structure as the data service system 20 although the physical configuration of these data service systems may be different from the data service system 20 and from each other.

The data service system 20 is connected to a number of user terminals 11a through 11n via an interconnect network 12. Each of the user terminals 11a–11n can access the data service system 20 or other data service systems in the global Internet 14 or Intranet 13 via the interconnect network 12. The interconnect network 12 can be any known network, such as Ethernet, ISDN (Integrated Services Digital Network), T-1 or T-3 link, FDDI (Fiber Distributed Data Network), cable or wireless LMDS network, or telephone line network.

Each of the user terminals 11a–11n In may be at a residence, a school, or an office of the user. Each of the user terminals 11a–11n includes a web browser application program that allows the user to access the data services offered by the data service system 20 or other data service systems in the global Internet 14 or Intranet 13.

Each of the user terminals 11a–11n can be, for example, a personal computer, a network computer, a notebook computer, a workstation, mainframe computer, a supercomputer. Alternatively, each of the user terminals 11a–11n can be any other electronic system with data processing capabilities. For example, a web TV may be used for one or each of the user terminals 11a –11n. In addition, each of the user terminals 11a–11n may include a modem or network adaptor, depending on the network technology adopted for the interconnect network 12.

Figure 2:
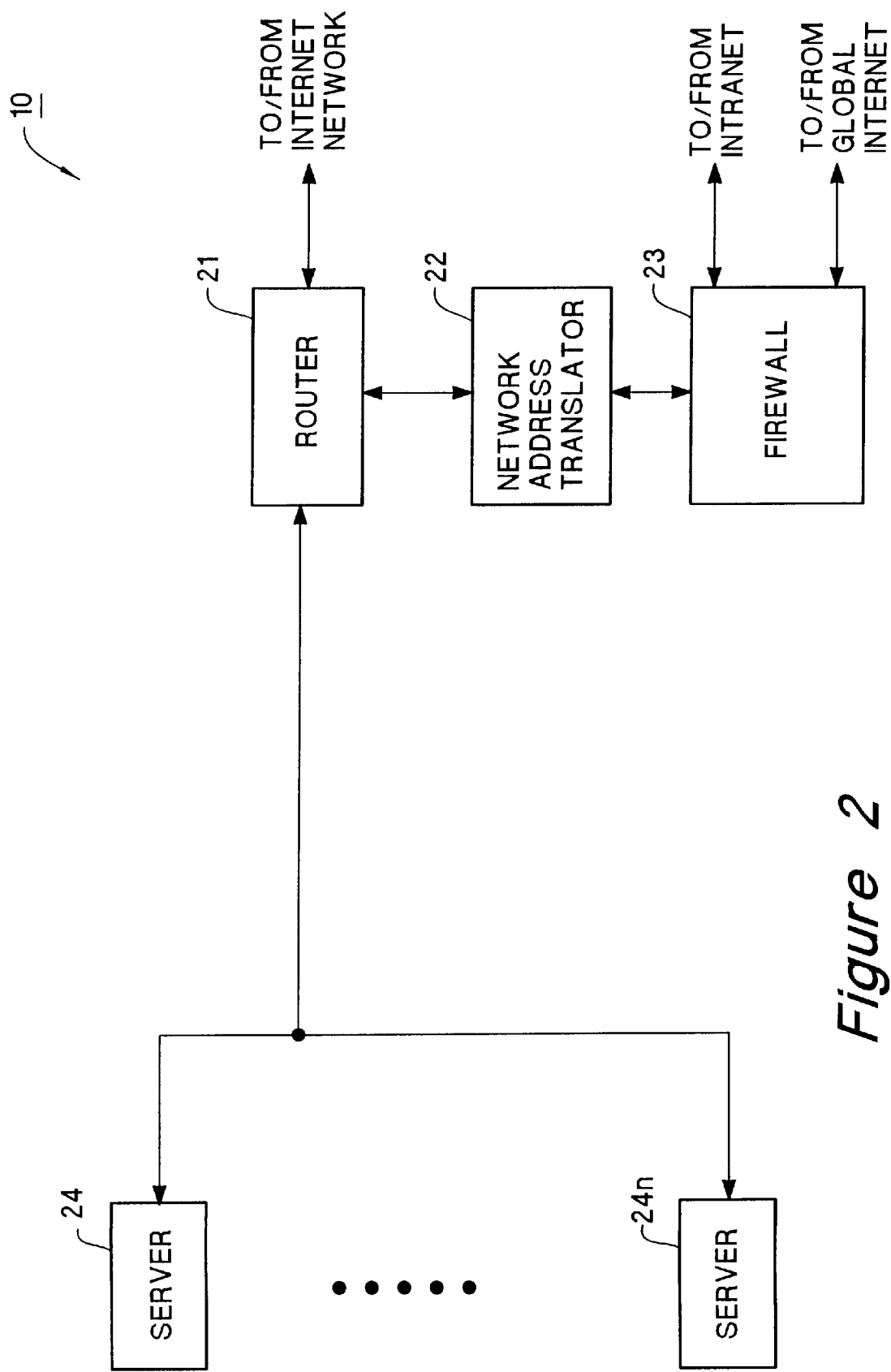
FIG. 2 shows the structure of data service system that includes a number of servers.

The data service system 20 provides data access services contracted by its customers to its users (e.g., at the user terminals 11a –11n and/or from the global Internet 14 or Intranet 13). The data services offered by the data service system 20 can be, for example, web, news, e-mail, e-commerce, advertisement, or other types of data services. Here, a customer means the entity contracting with the data service system 20 to have its content hosted in the data service system 20, or to have its services (e.g., e-commerce, e-mail, or news group) offered through the data service system 20. A user means the entity accessing one or more of the content sites hosted in the data service system 20. FIG. 2 shows the functional structure of the data service system 20, which will also be described in more detail below.

Referring to FIG. 2, the data service system 20 includes a number of servers 24 through 24n, a router 21, a network address translator 22, and a firewall 23. The router 21 is used for routing data to and from various modules within the data service system 20. The router 21 functions to connect the remote user terminals (e.g., the terminal 11a) to the appropriate servers 24–24n, or to the global Internet 14 or Intranet 13 via the firewall 23. The router 21 may use Asynchronous Transfer Mode (ATM) technologies to enable high bandwidth communication.

The network address translator 22 translates between a "private" address and a "public" address. The "private" address is used for a user to access the servers 24–24n within the data service system 20 and the "public" address is used for the user to access web sites in the global Internet 14 and Intranet 13. In cases when subscriber terminals are assigned "public" addresses directly, the system 20 does not include the network address translator 22.

The firewall 23 controls access to and from the system 20 from the global Internet 14 and Intranet 13. The Firewall 23 may be implemented in hardware or software and are included to enhance security of the system 20. Examples of known firewall technologies are packet-level filters and application-level gateways (e.g., socks).

The servers 24–24n may include web content servers, e-mail servers, news servers, e-commerce servers, domain name servers (DNSs), address assignment servers (e.g., Dynamic Host Configuration Protocol servers), proxy servers, subscription management servers, advertisement servers, and session manager servers. In addition, the servers 24–24n may include other servers. The web content servers, e-mail servers, news servers, e-commerce servers, and advertisement servers can be collectively referred to as local service servers.

The local service servers store contents that include Hyper-Text Markup Language (HTML) web pages, gif images, video clips, etc. Data transfers to and from the local service servers are enabled by transport protocols such as Transport Control Protocol (TCP) and the User Datagram Protocol (UDP). The local service servers support a variety of Internet applications to provide services such as access to the World Wide Web, electronic mail, bulletin boards, chat rooms, and news groups. Using web browser and other client applications, users can access Web pages, news, and e-mail stored in the local service servers via their terminals. In addition, the users can also access Web pages located at remote sites of the global Internet 14 or Intranet 13.

The address assignment servers assign an address to a user terminal when it first accesses the data service system 20. Specialized address assignment protocols such as Dynamic Host Configuration Protocol (DHCP) are used by the address assignment servers to assign addresses to user terminals. The proxy servers may be used to enhance security of accesses to and from the user terminals (e.g., the terminal 11n), as well as to speed up Internet access by caching frequently accessed data locally.

The DNS servers provide mapping between host names and network addresses. This process is referred to as name resolution. Before accessing a web content server, the user's web browser application first contacts one of the DNS servers to find out the network address of the web content server. If the resolution fails, the web transfer is aborted. The session manager servers are used for the housekeeping purposes.

Figure 3:
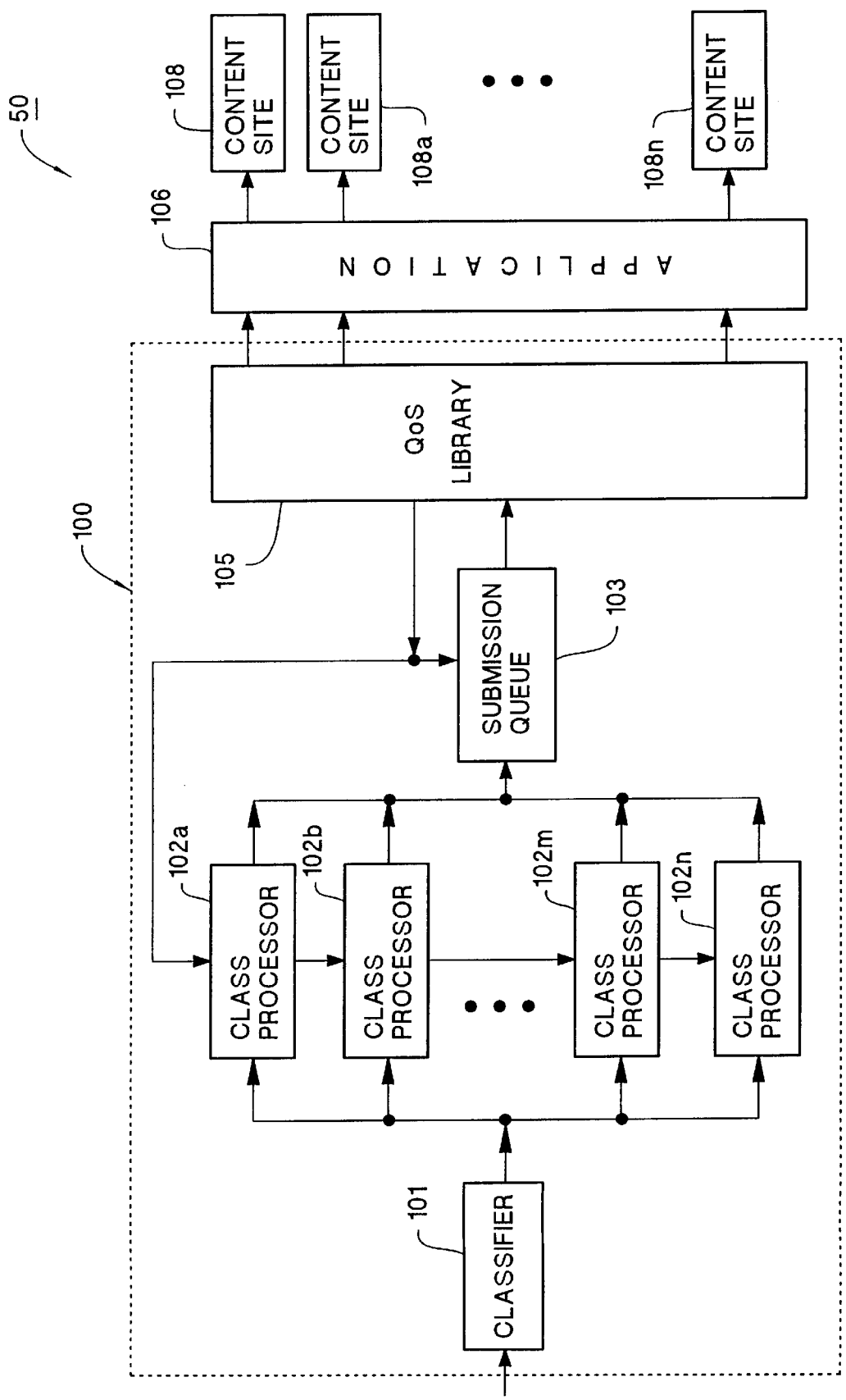
FIG. 3 shows the structure of one of the servers of FIG. 2 that includes an access processing system to provide performance guarantees for the content sites hosted in the servers in accordance with one embodiment of the present invention, wherein the request processing system includes a classifier, a number of class processors, a submission queue and a Quality-of-Service (QoS) library.

Each of the servers 24–24n can be a connection-based (i.e., TCP-based) server or a non-connection-based server. A connection-based server can handle classifiable access requests to the contents hosted in the server. An example of a connection-based server is a web content server, an e-mail server, a news server, an e-commerce server, a local service server, a domain name server, and a proxy server. An example of a non-connection-based server is an address assignment server. Each connection-based server of the servers 24–24n includes a number of content sites. If a connection-based server is a web server, then the content sites are web sites, each of which contains a number of web pages. FIG. 3 shows the structure of a connection-based server 50 which can be any one of the connection-based servers of the servers 24–24n.

As can be seen from FIG. 3, the server 50 includes a number of content sites 108 through 108n. Each of the content sites 108–108n can be constructed using known Internet technology. A server application 106 is included in the server 50 that provides accesses to the content sites 108–108n. The application 106 can be any known application of a server in an ISP system. The server 50 also includes the access processing system 100 connected to the application 106. The access processing system 100 includes a QoS (i.e., Quality-of-Service) library 105 that is connected to the server application 106. The QoS library 105 provides an interface for the access processing system 100 to the application 106 such that the access processing system 100 is transparent to the application 106. This feature will be described in more detail below.

The access processing system 100 receives all the access requests to the content sites 108–108n before they are supplied to the content sites 108–108n via the QoS library 105 and the application 106. As described above and in accordance with one embodiment of the present invention, the access processing system 100 provides access throughput control to each or some of the content sites within the server 50 by controlling or limiting the access request rate and data transfer rate of those content sites. The access request rate refers to the connection rate which means the number of connections per second during the enforcement interval. The data transfer rate refers to the amount of data transferred per second during the enforcement interval. Parameters such as enforcement interval, class (e.g., IP address mask or content type), queue size, and threshold values are used to determine the admission control policy.

This arrangement allows the data service system 20 to host multiple content sites within a single system while offering performance guarantees to some or all of the content sites. In addition, the access processing system 100 also allows stable, independent, and targeted performance for the content sites 108–108n. This means that the access processing system 100 provides virtual isolation among the content sites 108–108n although they are all located within the same system. In addition, the access processing system 100 provides the server 50 with overload protection and tiered levels of request class performance.

The access processing system 100 can provide the access throughput control for each of the content sites 108–108n, or for some of the content sites 108–108n. If the access processing system 100 provides the access throughput control for some of the content sites 108–108n, the access processing system 100 may accept the access requests to the other content sites that do not have the access throughput control on, for example, a best effort basis. This means that these access requests will be accepted only if the data service system 20 currently has available capacity to process them. Moreover, the best effort approach can be also used to determine if a not-submitted access request can still be accepted on the best effort basis. In this case, the performance guarantees are tiered performance guarantees. The best effort approach may also be used when the access processing system 100 can provide the access throughput control for each of the content sites 108–108n. In this case, those access requests that were not accepted or submitted under the access throughput control policy have another chance of being accepted or submitted on the best effort basis.

To provide the access throughput control finction, the access processing system 100 employs a predetermined or pre-configured admission control policy for each of the content sites 108–108n that requires such control. The admission control policy specifies, for example, the maximum connection and data transfer rate for the corresponding content site or the guaranteed minimum connection and data transfer rate for the content site. As another example, the admission control policy may be based on the contents accessed (e.g., pathnames) or resource utilizations (e.g., CPU and/or disk accesses). The access processing system 100 determines whether an access request should be accepted based on the corresponding admission control policy. If the answer is yes, the access request is accepted and submitted to the application 106 via the QoS library 105. If not, the access request is not submitted. If the access request is not submitted, the access processing system 100 may reject the access request by notifying the requester of the rejection or may simply terminate its processing (e.g., rude connection shutdown). Moreover, the access processing system 100 may determine to still accept the not-submitted access request on the best effort basis. This allows the access processing system 100 to provide tiered performance guarantees for the content sites 108–108n.

The access request may be a request for connection to a content site or a request to transfer data from a content site. For the connection type of access request, the access processing system 100 determines whether the access request should be accepted and submitted by determining if the completed access requests plus the currently submitted access request is within the specified rate under the admission control policy. If so, the access request is accepted and submitted to the corresponding one of the content sites 108–108n via the application 106. If not, the access request is not submitted under the guaranteed rate. The access processing system 100 may, however, still accept and submit the access request on, for example, the best effort basis. The best effort criteria can be that the access processing system 100 holds the not-submitted access request for up to an extra predetermined time interval. If during that interval, the access processing system 100 determines that the data service system 20 has extra capacity to process the not-submitted access request, then the not-submitted request is accepted and submitted to the application 106. If not, the not-submitted request is rejected. For the data transfer type of access request, the access processing system 100 determines whether the access request should be accepted or submitted by determining if the completed data transfer rate exceeds the specified rate under the admission control policy. If not, the access request is accepted and submitted under the guaranteed rate. If so, the access request is not submitted. The access processing system 100 may, however, still accept the access request on, for example, the best effort basis. Under a more sophisticated approach, the access processing system 100 may attempt to determine the size of the response to the access request. One way would be to estimate the size based on the average response size.

The access processing system 100 can be implemented in hardware, software (e.g., in operating software or at user application level), or firmware form. In one embodiment, the access processing system 100 is implemented by software. In this case, the access processing system 100 is implemented independent of the applications within the server 50. This means that the system 100 is transparent to the application 106 and is not integrated into the application 106. The QoS library 105 serves as the interface of the access processing system 100 to the application 106. The QoS library 105 is invoked by the application 106 to receive an access request for one of the content sites 108–108n. Furthermore, a software implementation of the access processing system 100 at the operating system level can be even more transparent to the application 106 since the application 106 would not be required to be built with dynamic linking. Thus, the QoS library 105 functions as a transparent means to providing the performance guarantees and access control to the application 106 providing accesses to the content sites 108–108n. The QoS library 105 also monitors traffic through each of the content sites 108–108n and shares the traffic information with other components of the access processing system 100. The advantage of this approach is that no modification to the existing server applications or operating system is required and the system 100 can work with generic, off-the-shelf server infrastructure software (assuming the software is built with some type of dynamic linking). In addition, no specialized low level hardware or software support is required. Thus, the transparent approach allows the access processing system 100 to have wide applicability in a heterogeneous or multi-tier environment.

Alternatively, the properties and functions of the access processing system 100 may be integrated into the existing applications of the server 50 or the operating system of the computer system that embodies the server 50. In this case, modification of the existing applications to incorporate the functions is required. In addition, the access processing system 100 does not include the QoS library 105.

As can be seen from FIG. 3, the access processing system 100 includes a classifier 101, a number of class processors 102a–102n, and a submission queue 103, in addition to the QoS library 105. Alternatively, the access processing system 100 may function without some the above-mentioned modules. For example, the classifier 101 may be integrated into each of the class processors 102a–102n. As a further example, multiple submission queues may be used. Additional modules may also be included in the access processing system 100. Furthermore, the access processing system 100 may be implemented as a thread within the context of the application 106. In this case, the QoS library 105 and submission queue 103 may not be used.

Figure 4:
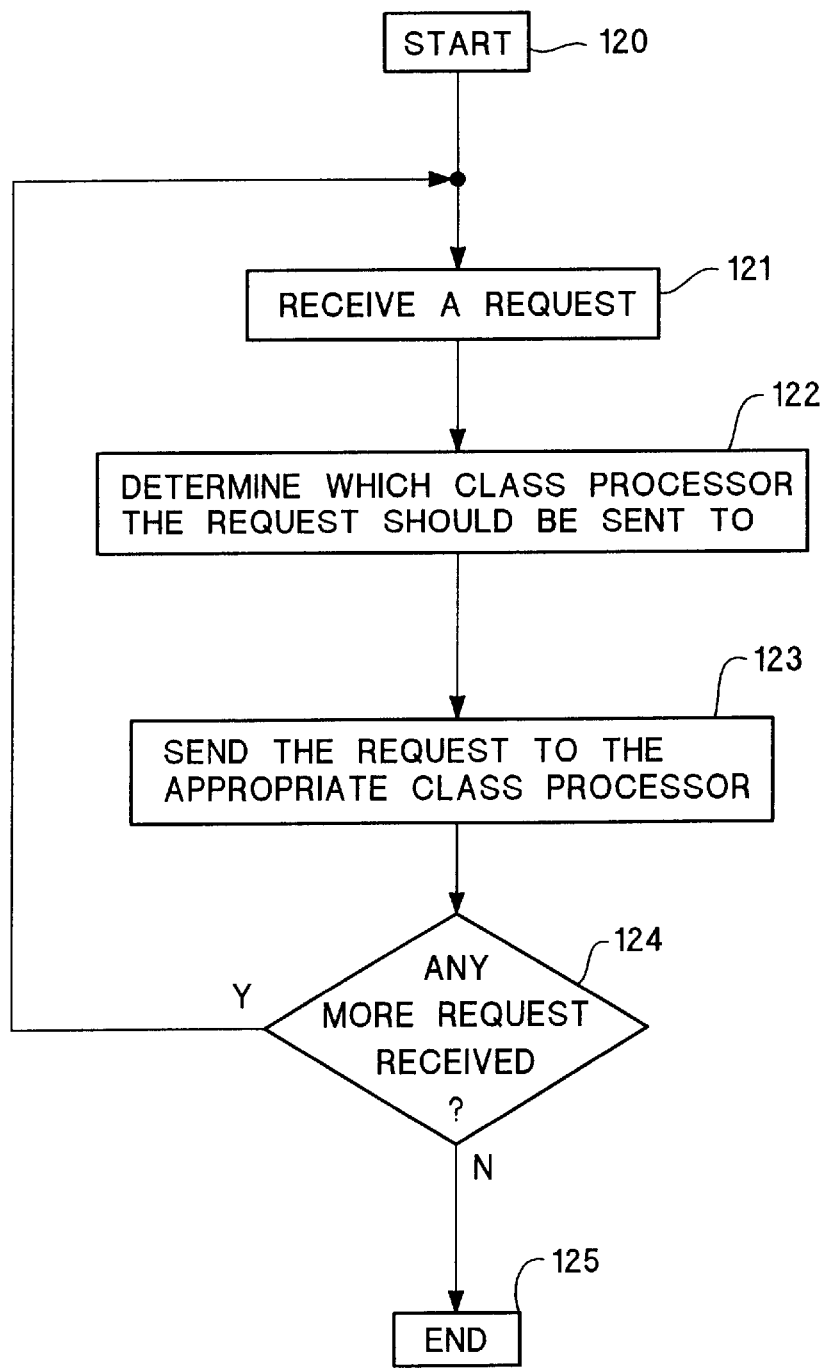
FIG. 4 is the flow chart diagram of the process implemented by the classifier of FIG. 3.

The classifier 101 is used to determine to which one of the class processors 102a–102n the received access request should be sent. The classifier 101 makes this determination based on the destination IP address of the access request, or any other attribute such as content type (i.e., pathname in the sender's address), session identifier, destination server name of the access request. As described above, each of the class processors 102a–102n is for one of the content sites 108–108n, or for one class of the content sites 108–108n that share the same admission control policy. FIG. 4 shows the classifying process of the classifier 101, which will be described in more detail below. The classifier 101 can be implemented using any known technology.

Figure 5:
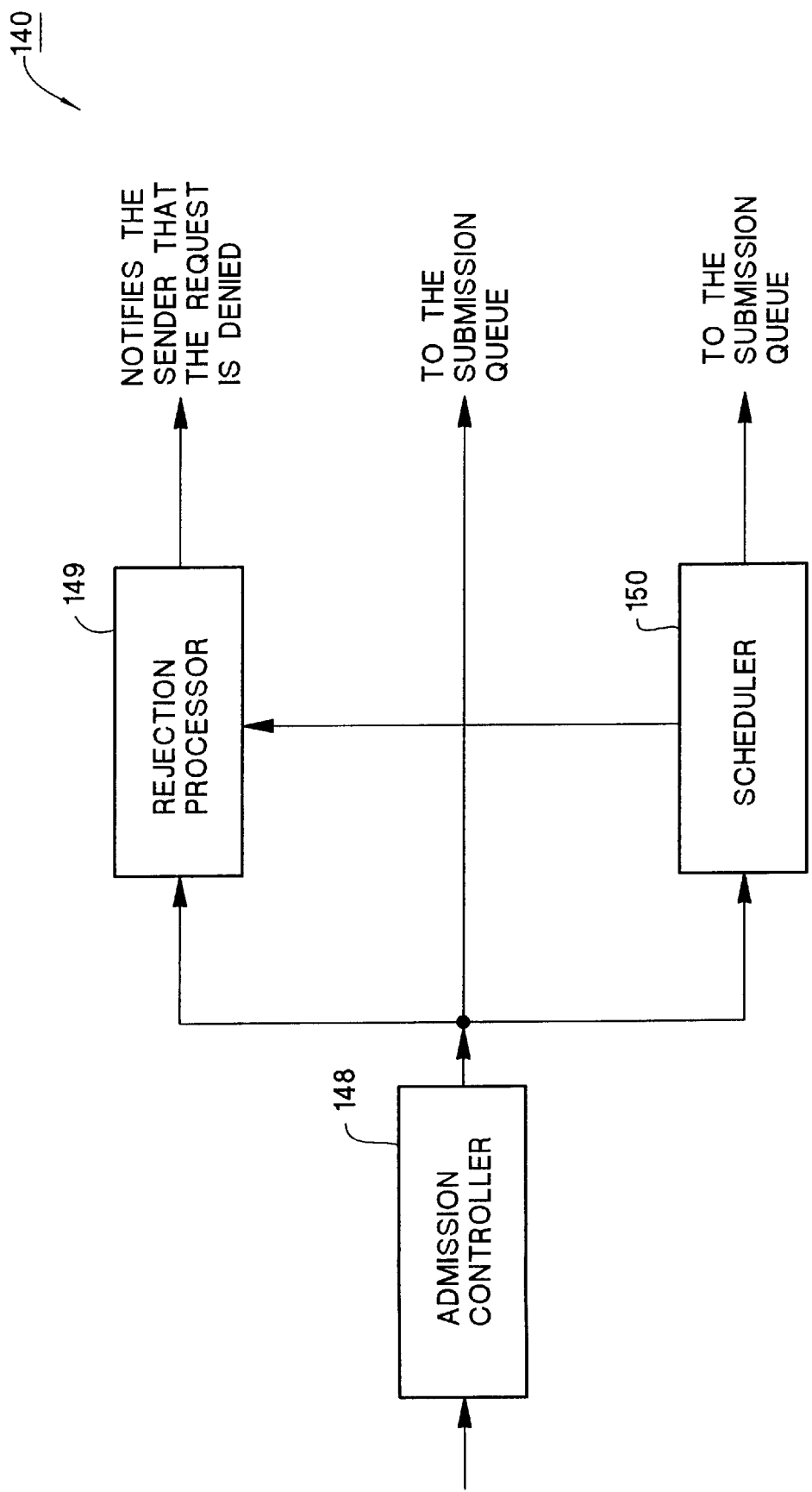
FIG. 5 shows the structure of each of the class processors of FIG. 3.
Figure 6:
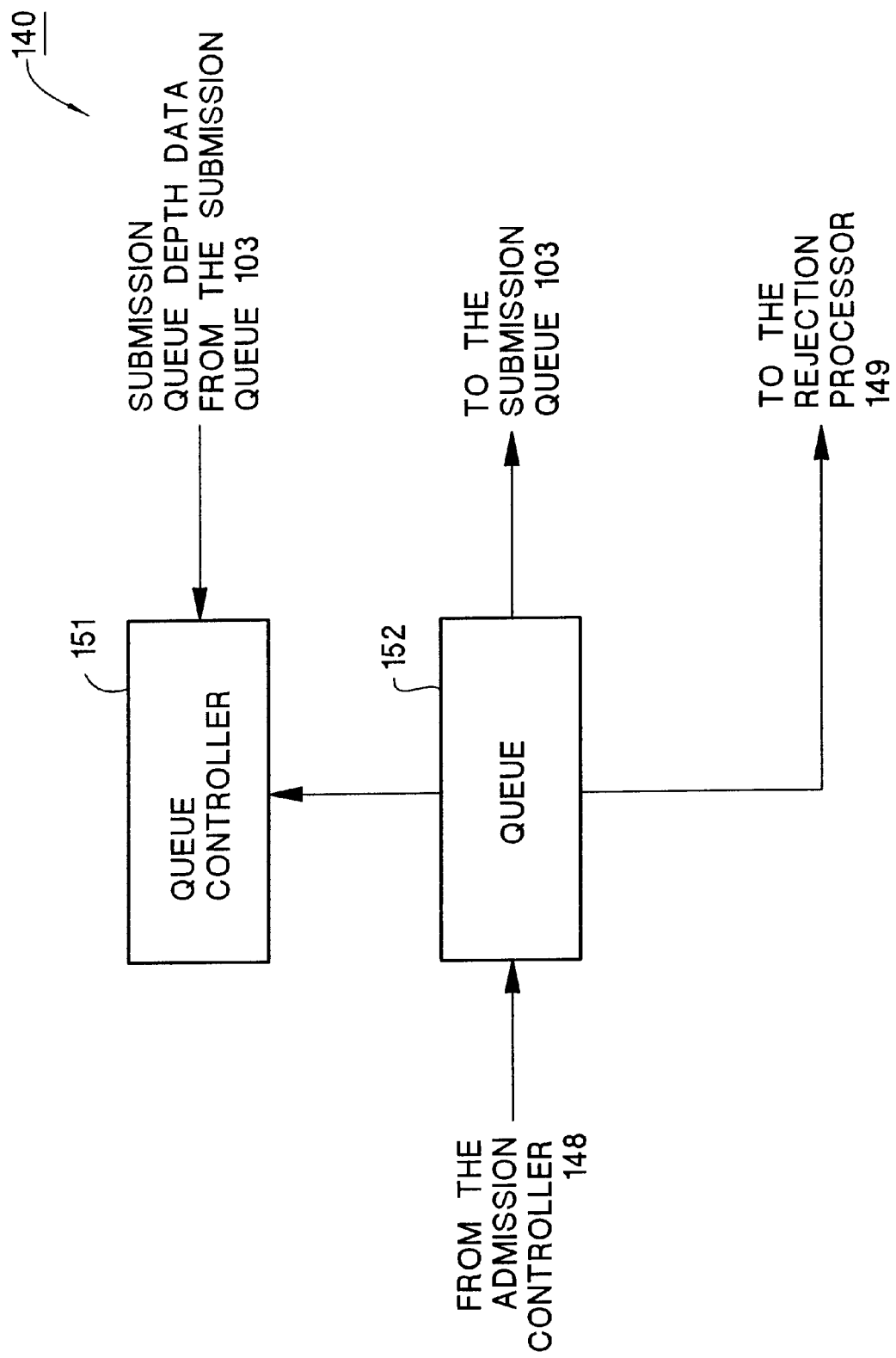
FIG. 6 shows the structure of the scheduler of each of the class processor of FIG. 5.

Referring again to FIG. 3, the class processors 102a–102n are used to determine whether a received access request should be accepted based on the corresponding admission control policy. If so, the received access request is sent to the submission queue 103. If not, the access request is rejected or deferred and again processed to determine if it can be accepted on the best effort basis. FIGS. 5 and 6 show in more detail the structure of each of the class processors 102a–102n, which will be described in more detail below.

The submission queue 103 is used to queue the accepted access requests before they are received by the application library 105. The submission queue 103 has a predetermined maximum queue depth. In one embodiment, the submission queue is a FIFO (First-In-First-Out) queue. Alternatively, the submission queue 103 can be other type of queue. The submission queue 103 can be implemented by any known technology. The submission queue 103 maintains the current depth of the queue and the class processors 102a–102n use the queue depth data of the submission queue 103 in the admission control decision.

The submission queue 103 manages its queue in the following fashion. The submission queue 103 receives an accepted access request from any one of the class processors 102a–102n at any time. If the queue is full, the class processors 102a–102n will reject later received access request. For those access requests waiting in each of the class processors 102a–102n to be processed on the best effort basis, they are submitted to the submission queue 103 only when its queue depth is smaller than a predetermined queue depth threshold. At this time, only the number of access requests equal to the threshold minus actual depth can be submitted to the submission queue 103 based on the best effort criteria.

FIG. 4 shows the flow chart diagram of the process of the classifier 101 of FIG. 3. As can be seen from FIG. 4, the process starts at the step 120. At the step 121, the classifier 101 receives a request. At the step 122, the classifier 103 determines to which of the class processors 102a–102n the request should be sent. At the step 123, the classifier 101 sends the request to the appropriate class processor. At the step 124, the classifier 101 determines if more requests have been received. If so, the process returns to the step 121. If not, the step 125 is the next step.

FIG. 5 shows the structure of a class processor 140 which can be any one of the class processors 102a through 102n of FIG. 3. As can be seen from FIG. 5, the class processor 140 includes an admission controller 148, a scheduler 150, and a rejection processor 149. The admission controller 148 is used in the class processor 140 to receive the access request and to process the access request received in accordance with the corresponding predetermined admission control policy. If the admission controller 148 determines to accept the access request based on the corresponding admission control policy, then the admission controller 148 sends the access request to the submission queue 103 (FIG. 3). If the admission controller 148 determines that the access request cannot be accepted based on the corresponding admission control policy, then the admission controller 148 can do one of two things. First, the admission controller 148 can send the access request to the rejection processor 149 directly. The second thing the admission controller can do is to place the access request on a best effort queue within the scheduler 150 (shown in FIG. 6 as the best effort queue 152). When the best effort queue is also full, then the access request is sent to the rejection processor 149. In this case, the admission controller 148 may also accesses the queue information of the submission queue 103 to determine if the access request should be sent to the best effort queue in the scheduler 150. If, for example, the queue 103 is full or substantially full (e.g., 90% full), then the admission controller 148 sends the not-submitted access request to the rejection processor 149 for rejection. If the queue 103 is not substantially full, the admission controller 148 sends the notsubmitted request to the scheduler 150 to determine if the not-submitted request can still be accepted on the best effort basis.

The admission controller 148 can be implemented using any known technology. For example, when the admission control policy specifies a maximum access rate or minimally guaranteed access rate for the corresponding content site, the admission controller 148 first determines whether the specified access rate has been reached when receiving the access request. If so, the admission controller 148 can deny or defer access of the access request. If not, the admission controller 148 can accept the access request. This can be done using known technology.

The scheduler 150 is connected to the admission controller 148. The scheduler 150 is invoked only when no new access request is received in the class processor 140. The scheduler 150 determines if the access request that has not been accepted for submission by the admission controller 148 under the predetermined admission control policy (i.e., those requests that have been placed in the best effort queue 152) can still be accepted by the submission queue 103 based on the best effort criteria. This means that the submission queue 103 may accept the access request if the data service system 20 currently has some capacity to handle extra access requests.

The best effort criteria is based on the depth of the submission queue 103 and/or the depth of the best effort queue (i.e., the queue 152) within the scheduler 150. If the depth is greater than a predetermined threshold value, the scheduler 150 will not submit the deferred request on the best effort basis. The scheduler 150 has access to all the best effort queues and determines if not submitted (i.e., deferred) access requests can be submitted to the submission queue 103 based on the depth of the submission queue 103. There is also a timeout parameter for the access requests in the best effort queue 152. If an access request has been in the queue for longer than the timeout value, then the access request is sent to the rejection processor 149. FIG. 6 shows the structure of the scheduler 150, which will be described in more detail below.

Referring again to FIG. 5, the rejection processor 149 is connected to the admission controller 148 and the scheduler 150. The rejection processor 149 is employed to handle the rejection process of the access requests. This means the rejection processor 149 may need to notify the requester that his request has been rejected. This embodiment involves the use of an external processor in front of the server system. In addition, the rejection processor 149 may need to perform other necessary and known housekeeping functions in connection with the rejection.

Referring to FIG. 6, the structure of the scheduler 150 is shown. As can be seen from FIG. 6, the scheduler 150 includes a queue controller 151 and the best effort queue 152. The queue controller 151 controls the queue 151 to accept an access request from the admission controller 148 based on the predetermined best effort criteria. In one embodiment, the best effort criteria is based on the queue depth of the submission queue 103 (FIG. 3). In this case, the queue controller 151 has access to the submission queue depth data. The queue controller 151 uses the submission queue depth data to determine if the current access request should be accepted on the best effort basis. The submission queue 103 can accept an access request from the scheduler of one the class processors 102a–102n if the queue depth of the submission queue 103 is less than the predetermined threshold value. The predetermined depth threshold value can be set in accordance with the system specification of the data service system 20.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. In a data service system that includes a plurality of content sites, a method of controlling access throughput of the content sites, comprising the steps of:
    defining a throughput control policy for each of the content sites, wherein a throughput control policy for a content site specifies permitted access request rate and data transfer rate for the corresponding content site;

upon receiving an access request, determining to which one of the content sites the access request is sent;

determining if the access request should be allowed to access the corresponding content site based on the throughput control policy for that content site;

allowing the access request to access the corresponding content site if the throughput control policy allows the access request to access the corresponding content site.

2. The method of claim 1, further comprising the steps of (I) determining if the access request can be accepted based on emptiness of a submission queue or based on resource utilization of the data service system if the access request is determined not to be accepted in accordance with the corresponding throughput control policy, wherein the submission queue queues all access requests that have been accepted;

(II) accepting the access request into a best effort queue if the best effort queue is not substantially full;

(III) rejecting the access request if access request is determined not to be accepted based on the throughput control policy or if the submission queue is substantially full;

(IV) submitting an access request from the best effort queue to the submission queue when the depth of the submission queue is less than a predetermined threshold value.

3. The method of claim 2, wherein the throughput control policy for a content site specifies the access request rate and the data transfer rate that are guaranteed to be handled by the data service system for the corresponding content site.

4. The method of claim 1, further comprising a step of classifying the content sites that share the same throughput control policy into one class.

5. The method of claim 1, further comprising the step of queuing the access request in a submission queue with other access requests already in the submission queue if the access request is determined to be accepted, and not to queue the access request if the access request is determined to be rejected.

* * * * *